July 28, 1970  K. F. GRUNER ET AL  3,521,673
CONSTANT FLOW FLUID DIVERTING VALVE
Filed April 29, 1968  2 Sheets-Sheet 2
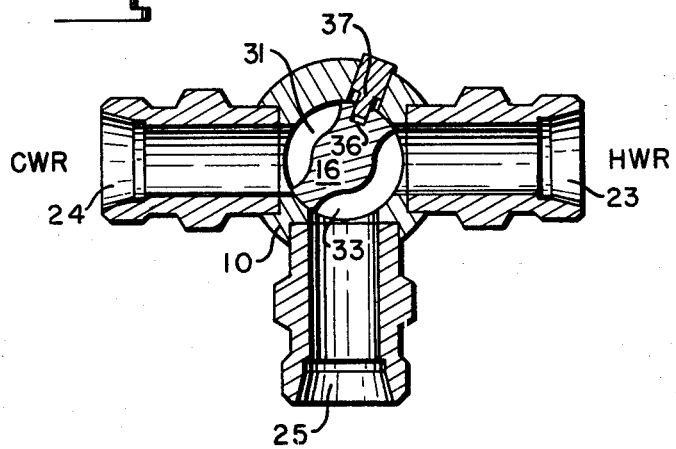
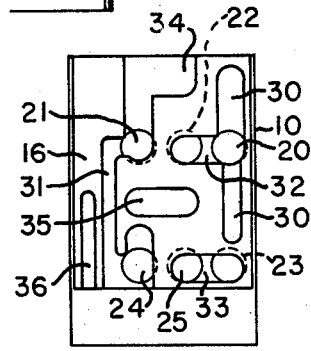
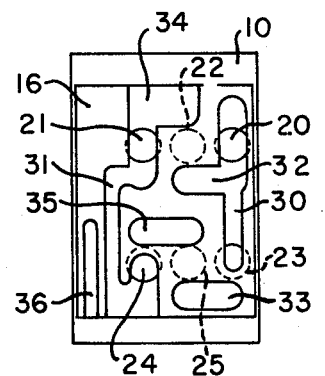
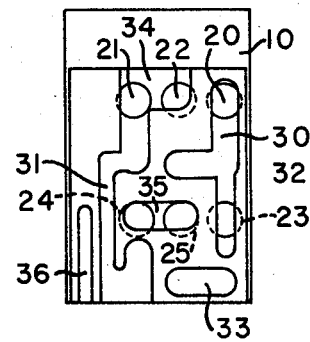
INVENTOR.
KARL F. GRUNER
GUNTER P. SCHOLZ
BY Alan M. Staubly
ATTORNEY.

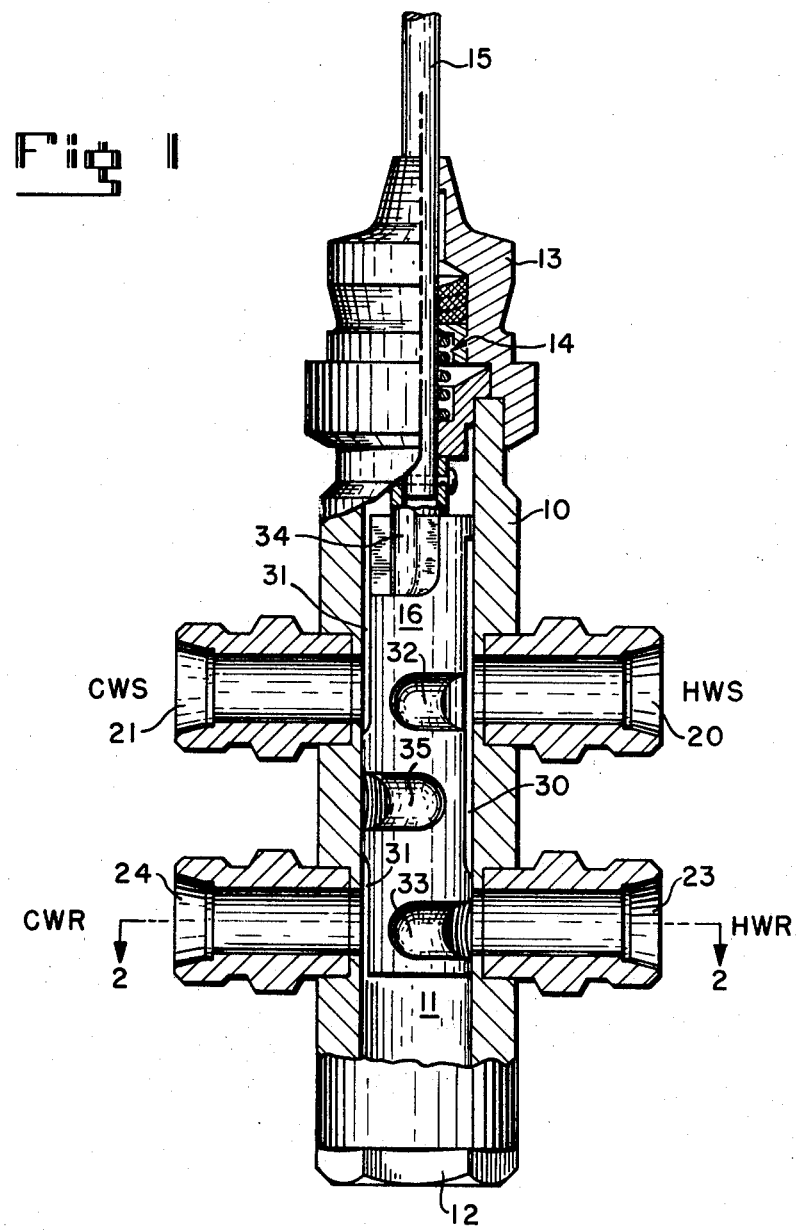

United States Patent Office 3,521,673
Patented July 28, 1970

3,521,673
CONSTANT FLOW FLUID DIVERTING VALVE
Karl F. Gruner, Offenbach am Main, and Gunter P. Scholz, Dornigheim (Main), Germany, assignors to Honeywell G.m.b.H., Frankfurt am Main, Germany
Filed Apr. 29, 1968, Ser. No. 725,048
Claims priority, application Germany, Aug. 18, 1967, H 63,633
Int. Cl. F16k 11/06
U.S. Cl. 137—625.29        8 Claims

ABSTRACT OF THE DISCLOSURE

A six-port fluid diverting valve especially for use in four-pipe temperature conditioning systems and having a cylindrical plunger longitudinally movable in a valve body to selectively connect appropriate ports. The plunger has fluid passages formed on its surface including two longitudinal passages each continuously in communication with one of the fluid supply ports and adapted to communicate with a corresponding return port, and a plurality of transversely extending passages positioned to cooperate with appropriate load ports depending upon the longitudinal position of the plunger. The passages are disposed to connect one set of supply and return ports across the load port while connecting the other supply directly to its return port, or to completely interrupt flow to the load ports while connecting both inlet ports directly to their respective outlet ports, to provide a constant flow through the valve at all times and in all positions of the plunger.

BACKGROUND OF THE INVENTION

This invention relates to a unitary six-port valve for use in four-pipe heating and cooling systems and includes a structure providing a by-pass arrangement whereby a constant flow of heating and cooling fluid is maintained at all times and in all positions of the valve.

Various types of six-port valves providing this bypass feature have been proposed. For example, a spool-type valve providing this by-pass function is disclosed in copending application Ser. No. 629,719, now Pat. No. 3,411,538, of Karl F. Gruner and Heinrich K. Lau, filed Apr. 5, 1967, and assigned to the assignee of the present invention. In the Gruner and Lau disclosure, the ports in the valve are disposed longitudinally therealong and a by-pass passage is provided either in the valve body or in the spool itself which has a plurality of lands co-operating with the ports. While the Gruner and Lau disclosure provides a very satisfactory valve, it has been found to have some shortcomings. One of these is the overall length of the valve which makes it difficult to install in many applications. Another shortcoming is that there are relatively long flow paths for the heating and cooling fluids within the vlave resulting in some loss of energy between the two fluids in the valve.

Pat. No. 3,241,602 discloses a valve providing generally the same functions as the valve of this application but only by the use of an extremely complex valve including an axially movable plug or plunger with complex internal passages formed therein and with a valve body having complex passages in it.

BRIEF SUMMARY OF THE INVENTION

The valve of this invention provides the control and by-pass features of the above noted pending application and issued patent but reduces the overall size of the valve and the likelihood of energy loss between the heating and cooling fluid within the valve by reducing the length of the flow passages therein. Furthermore, it accomplishes these results while utilizing an extremely simply construction which does not require internal passages within the valve plunger or the valve body as has been required in some of the prior art devices in order to obtain these features.

The valve has a body with a cylindrical opening in which there is disposed a generally cylindrical, longitudinally movable, plunger. Disposed about the valve body, in one portion thereof, are a pair of supply ports and a load port extending transversely to the longitudinal axis of the body. Longitudinally spaced from these ports and substantially aligned therewith are a pair of return ports and a second load port, respectively. The plunger has formed on its surface two longitudinally extending fluid passages, one of which is continuously in communication with the first supply port and the other of which is continuously in communication with the second supply port. These passages are adapted to communicate, in certain positions of the plunger, with the respective return ports. First, second, third and fourth transversely extending fluid passages are provided in the plunger and are adapted to connect the first longitudinal passage to the first load port, to connect the first return port to the second load port, to connect the second longitudinal passage to the first load port, and to connect the second return port to the second load port, respectively, depending upon the position of the plunger in the valve body. These passages are so formed and so disposed that in one end position of the plunger the second longitudinal passage connects the second supply port directly to the second return port while the first transverse passage connects the first longitudinal passage to the first load port and the second transverse passage connects the second load port to the first return port, and in the other end position the first longitudinal passage connects the first supply port directly to the corresponding return port while the third transverse passage connects the second longitudinal passage to the first load port and the fourth transverse passage connects the second load port to the second return port. At an intermediate position at least one of the load ports is blocked by the plunger while both the first and second supply ports are connected to their respective return ports by the first and second longitudinal passages, respectively.

CLAIM OF PRIORITY

The applicants claim the filing date of Aug. 18, 1967, for this application, based on the first mentioned German application referred to in the declaration.

DESCRIPTION OF THE DRAWING

FIG. 1 is a longitudinal cross-sectional view of a six-port diverting valve constructed according to this invention. FIG. 2 is a transverse cross-sectional view taken generally along line 2—2 of FIG. 1. FIGS. 3–5 disclose the plunger surface and the cooperating portion of the valve body schematically and projected onto a flat plane in order to show the relative position of the passages therein and disclose the relative position of the passages and the cooperating ports when the plunger is in its uppermost position, a center position, and its lowermost position, respectively.

DETAILED DESCRIPTION

Referring to the drawing, there is disclosed a six-port fluid diverting valve having a body 10 and a generally cylindrical opening or passage 11 extending longitudinally therethrough. The lower end of passage 11 is closed by an appropriate sealing plug 12. At the upper end, a sealing nut 13 is secured to the body and surrounds appropriate packing 14 about the stem 15 of a plunger 16 which is slidably disposed in opening 11. Opening 11 is a generally cylindrical opening and plunger 16 is of a matching shape.

Diametrically opposed near the upper end of body 10 and opening into the opening 11 are first and second inlet or supply ports 20 and 21, respectively. In substantially the same plane as ports 20 and 21, and angularly disposed midway between them, is a load port 22 (see FIGS. 3–5) which also connects into opening 11. It will be noted that these three ports lie substantially in a single plane which is disposed transversely to the longitudinal axis of the valve. Disposed near the lower end of the valve body are diametrically opposed return ports 23 and 24 which will be referred to herein as the first and second return ports, respectively. These ports also connect to opening 11 in the valve body. Lying in substantially the same plane as ports 23 and 24, and disposed angularly midway between them, is a second load port 25. It will be noted that ports 23, 24 and 25 lie substantially in a plane which is generally parallel to the plane in which ports 20, 21 and 22 lie.

It has been noted previously herein that the diverting valve is especially intended for use with four-pipe heating and cooling systems. When so used, the ports may be connected, for example, in such a manner that port 20 is connected to the hot water supply, port 21 to the cold water supply, port 22 to the supply passage for a heat exchanger, port 23 to the hot water return, port 24 to the cold water return, and port 25 to the return passage from the heat exchanger.

Plunger 16 has formed therein a plurality of passages including a first longitudinal passage 30 which is continuously in communication with supply port 20 and which is adapted, in certain longitudinal positions of the plunger, to also communicate with the first return port 23. Angularly spaced from passage 30 is a second longitudinally extending passage 31 which is continuously in communication with supply port 21 and is adapted, in certain longitudinal positions of plunger 16, to communicate with the second return port 24. These passages are formed in the surface of plunger 16 and passage 30 extends substantially straight in a longitudinal direction. Passage 31 has a central portion offset laterally so that it surrounds or by-passes one of the transverse passages which will be discussed hereinafter. Passage 31 is preferably formed so that it connects the top and bottom of the plunger so that fluid supplied to port 21 acts on each end of the plunger to balance it.

Also formed in the surface of plunger 16 are a plurality of transverse passages including a first transverse passage 32 which connects into longitudinal passage 30 and is adapted, in certain positions of the plunger, to connect passage 30 with load port 22. A second transverse passage 33 is disposed near the bottom of plunger 16 and has one portion directly under passage 30. Passage 33 is disposed so that in certain positions of the plunger it connects return port 23 to load passage 25. A third transverse passage 34 is disposed adjacent to the top of the plunger and connects into the top of longitudinal passage 31. Passage 34 is disposed so that in certain positions of the plunger it connects passage 31 to load port 22. A fourth transverse passage 35 is disposed intermediate the two longitudinal passages and in such a position that, in certain positions of the plunger, it connects return port 24 and load port 25. It will be noted that transverse passages 32 and 34 extend from longitudinal passages 30 and 31, respectively, into the area between them and to a position so that they will overlie the lateral position of load port 22. Similarly, transverse passages 33 and 35 are disposed so that each has a portion which overlies the lateral position of second load port 25.

Since it is essential that plunger 16 be able to move longitudinally within valve body 10, but not be allowed to rotate, a longitudinal groove 36 has been provided in the surface of plunger 16. Cooperating with this groove is a generally radially extending pin 37 mounted in body 10.

The operation of the valve can best be seen by referring to FIGS. 3–5. In FIG. 3, plunger 16 occupies its uppermost position as is shown in FIG. 1. In this position transverse passage 32 connects longitudinal passage 30 (which is always connected to supply port 20) to load port 22. Transverse passage 33 is in registry with second load port 25 and with first return port 23. This provides a connection from the supply, through the valve to the load (such as a heat exchanger) back into the valve and to the return. At the same time, second longitudinal passage 31 provides a connection between second supply port 21 and the corresponding return port 24 so that a full by-pass of the fluid entering through port 21 is provided directly to the return. As the plunger is moved downwardly, it eventually reaches the midway position which is disclosed in FIG. 4. In this position transverse passage 32 has been moved out of registry with load port 22 and transverse passage 33 has been moved out of registry with ports 23 and 25. In this position longitudinal passage 31 still connects inlet port 21 and the corresponding return port 24 to provide a cold water by-pass and passage 30 now registers with return port 23 as well as with supply port 20 so that the heating fluid is also provided with a full by-pass direct to its return. It will be noted that in this position both of the load ports 22 and 25 are blocked by plunger 16.

Further movement to the lower end position of the plunger results in the relative positioning of the ports and passages as disclosed in FIG. 5. In this position passage 30 still connects inlet port 20 and corresponding return port 23 to provide a full by-pass of the heating fluid. In this position, longitudinal passage 31 has been moved out of registry with return port 24 which now registers with transverse passage 35 which also is in registry with load passage 25. Transverse passage 34 is now in registry with load port 22 so that fluid entering through supply port 21 is conveyed to load port 22, through the load, back through load port 25 and to return port 24.

Three distinct positions of the plunger have been described but it will be appreciated that modulation in either heating or cooling can be obtained by positioning the plunger at intermediate positions so that only a portion of one of the fluids flows to the load. For example, if the plunger assumes a position intermediate the position disclosed in FIGS. 3 and 4, the cooling fluid entering through port 21 will still be by-passed directly to the return port 24. However, transverse passage 32 will be only in partial registry with load port 22 and transverse passage 33 will be only partially in registry with ports 23 and 25. A portion of the heating fluid will pass through the heat exchanger while another portion of it will be by-passed directly to return port 23 which will also be partially in registry with longitudinal passage 30.

With the arrangement of passages disclosed, the length of the valve is kept to a minimum and the length of the passages through which the fluids pass are also kept relatively short. By so doing, not only is the valve easy to install in relatively crowded spaces such as are often encountered, but also a minimum amount of heat is transferred to the plunger and body and, in turn, transferred to the cooling fluid.

The single embodiment of the invention has been described by way of example but various modifications may become apparent to those skilled in the art in view of the disclosure herein. Therefore, it is to be understood that the invention is to be limited solely by the scope of the appended claims.

The embodiments of the invention in which an exclusive property or right is claimed are defined as follows:

1. A six-port, constant flow, fluid diverting valve of the type having a body with a longitudinal axis and with first and second supply ports, first and second return ports and first and second load ports and having a single plunger longitudinally movable between two end positions in the valve body to control the flow of fluid, the valve characterized by:

said first and second supply ports and said first load port being spaced about the valve body with their axes disposed transversely to said longitudinal axis in one portion of said body;

said first and second return ports and said second load port being similarly spaced about the valve body and generally in longitudinal alignment with said first and second supply ports and said first load port, respectively, in another portion of said body which is longitudinally displaced from said one portion thereof;

said plunger having a plurality of passages in the surface thereof including a first longitudinal passage continuously in communication with said first supply port and having a portion adapted to communicate with said first return port, a second longitudinal passage continuously in communication with said second supply port and having a portion adapted to communicate with said second return port and first, second, third and fourth transverse passages adapted to connect said first longitudinal passage to said first load port, to connect said first return port to said second load port, to connect said second longitudinal passage to said first load port, and to connect said second return port to said second load port, respectively, and said passages being so formed and so disposed on said plunger that in one end position of said plunger said second longitudinal passage connects said second supply port directly to said second return port, said first transverse passage connects said first longitudinal passage to said first load port, and said second transverse passage connects said second load port to said first return port, and in the other end position said first longitudinal passage connects said first supply port directly to said first return port, said third transverse passage connects said second longitudinal passage to said first load port, and said fourth transverse passage connects said second load port to said second return port, and in an intermediate longitudinal position said first longitudinal passage connects said first supply port directly to said first return port, said second longitudinal passage connects said second supply port directly to said second return port and at least one of said load ports is blocked by said plunger.

2. The fluid diverting valve of claim 1 wherein the plunger is a generally cylindrical member and said second longitudinal passage connects its ends so that the plunger will be balanced when fluid pressure is applied to said second supply port.

3. The fluid diverting valve of claim 1 wherein said first longitudinal passage extends substantially straight in the longitudinal direction, and said second longitudinal passage has a portion near its center laterally offset and extending around said fourth transverse passage.

4. The fluid diverting valve of claim 1 wherein the plunger is a generally cylindrical member slidably disposed in a matching opening in the valve body, and there is provided means precluding rotation of said plunger in said body.

5. The fluid diverting valve of claim 4 wherein the means precluding rotation of said plunger includes a longitudinal groove in one of said plunger and said body and a radially extending pin extending from the other of said plunger and said body and slidably disposed in said groove.

6. The fluid diverting valve of claim 4 wherein said first and third transverse passages are longitudinally spaced and extend from said first and second longitudinal passages, respectively, into the area between said longitudinal passages to a position so that they overlie the lateral position of said first load port.

7. The fluid diverting valve of claim 6 wherein said first and second supply ports are diametrically opposed in said body and said first load port is disposed in an angular position midway between said supply ports.

8. A fluid diverting valve as defined in claim 1 wherein the axes of said first and second supply ports and said first load port lie substantially in a common plane.

References Cited

UNITED STATES PATENTS 3,411,538  11/1968  Gruner et al. _____ 137—625.29

ARNOLD ROSENTHAL, Primary Examiner